US011899285B2

(12) United States Patent
Zhu et al.

(10) Patent No.: US 11,899,285 B2
(45) Date of Patent: Feb. 13, 2024

(54) PHOTOTHERMAL MODIFICATION OF HIGH INDEX DIELECTRIC STRUCTURES

(71) Applicant: Danmarks Tekniske Universitet, Kgs. Lyngby (DK)

(72) Inventors: Xiaolong Zhu, Kgs. Lyngby (DK); Anders Kristensen, Frederiksberg (DK); Niels Asger Mortensen, Kgs. Lyngby (DK)

(73) Assignee: Danmarks Tekniske Universitet, Kgs. Lyngby (DK)

( * ) Notice: Subject to any disclaimer, the term of this patent is extended or adjusted under 35 U.S.C. 154(b) by 79 days.

(21) Appl. No.: 16/470,782

(22) PCT Filed: Dec. 22, 2017

(86) PCT No.: PCT/EP2017/084557
§ 371 (c)(1),
(2) Date: Jun. 18, 2019

(87) PCT Pub. No.: WO2018/122208
PCT Pub. Date: Jul. 5, 2018

(65) Prior Publication Data
US 2019/0339543 A1 Nov. 7, 2019

(30) Foreign Application Priority Data
Dec. 30, 2016 (EP) .................................... 16207500

(51) Int. Cl.
*G02C 7/02* (2006.01)
*G02C 7/04* (2006.01)

(52) U.S. Cl.
CPC ............. *G02C 7/022* (2013.01); *G02C 7/049* (2013.01)

(58) Field of Classification Search
CPC .. G02C 7/022; G02C 7/049; G02B 2207/101; G02B 5/288; G02B 5/207; G02B 5/1809;
(Continued)

(56) References Cited

U.S. PATENT DOCUMENTS 5,824,374 A * 10/1998 Bradley, Jr. ............ G02B 5/201
427/555
6,291,797 B1 * 9/2001 Koyama ................. C03C 17/23
216/65
(Continued)

FOREIGN PATENT DOCUMENTS

WO WO 2006/016265 A1 2/2006

OTHER PUBLICATIONS

Brongersma M et al., "Light management for photovoltaics using high-index nanostructures", Nature Materials, vol. 13, May 2014.
(Continued)

*Primary Examiner* — Balram T Parbadia
*Assistant Examiner* — Gabriel A Sanz
(74) *Attorney, Agent, or Firm* — Knobbe Martens Olson & Bear LLP

(57) ABSTRACT

There is presented a method for geometrically modifying high-index dielectric structures on a support structure which includes steps of providing a support structure and a first plurality of high-index dielectric structures supported by the support structure. The method includes changing a geometry of the high-index dielectric structures within a second plurality of high-index dielectric structures, being a sub-set of the first plurality of high-index dielectric structures. The geometry is changed by photothermally melting some of the high-index dielectric structures within the second plurality of high-index dielectric structures by irradiating them with incident electromagnetic radiation, and thereby exciting resonances associated with each of the high-index dielectric
(Continued)

structures within the second plurality of high-index dielectric structures. The support structure comprises a first plurality of topographical features and the first plurality of high-index dielectric structures are given by high-index dielectric structures on or in said topographical features and holes in a high-index dielectric film.

27 Claims, 5 Drawing Sheets

(58) Field of Classification Search
CPC ........ G02B 5/1842; G02B 5/203; G02B 5/18; G02B 5/20; G02B 5/28; G02B 5/008; B41M 5/34; B41M 5/46; B41M 7/0081; B41M 5/40; G11B 11/03; B23K 26/354
See application file for complete search history.

(56) References Cited

U.S. PATENT DOCUMENTS

| | | | | |
|---|---|---|---|---|
| 7,521,352 | B2* | 4/2009 | Shinomiya | G03F 9/708 |
| | | | | 257/E21.585 |
| 9,128,230 | B1* | 9/2015 | Mohamed | G02B 5/003 |
| 2008/0129936 | A1* | 6/2008 | Seo | G02B 5/285 |
| | | | | 349/106 |
| 2009/0075402 | A1* | 3/2009 | Meunier | G01N 21/171 |
| | | | | 438/7 |
| 2010/0197057 | A1* | 8/2010 | Tsuji | H01S 5/12 |
| | | | | 438/712 |
| 2014/0193933 | A1* | 7/2014 | Sakurai | H01S 5/2275 |
| | | | | 438/32 |
| 2016/0079361 | A1* | 3/2016 | Ching | H01L 21/324 |
| | | | | 977/938 |
| 2017/0192351 | A1* | 7/2017 | Yang | G02B 5/008 |
| 2017/0227681 | A1* | 8/2017 | Maury | G02B 5/008 |
| 2017/0235020 | A1* | 8/2017 | Bolshakov | G02C 7/022 |
| | | | | 351/159.01 |

OTHER PUBLICATIONS

Jahani S et al., "All-dielectric metamaterials", Nature Nanotechnology, vol. 11, pp. 23-36, Jan. 2016.
Staude I et al., "Tailoring Directional Scattering through Magnetic and Electric Resonances in Subwavelength Silicon Nanodisks", Acs Nano, vol. 7, No. 9, pp. 7824-7832, 2013.
Walia J, "Raman Characterization and Applications of Vertical Semiconductor Nanowires", Thesis presented to University of Waterloo, Ontario, Canada, 2016.
Zhu X et al., "Plasmonic colour laser printing", Nature Nanotechnology 11, 325 (2016).
Zijlstra P et al., "Five-dimensional optical recording mediated by surface plasmons in gold nanorods", Nature, MacMillan Journals Ltd., vol. 459, May 21, 2009, pp. 410-413.
Zywietz U et al., "Laser printing of silicon nanoparticles with resonant optical electric and magnetic responses", Nature Communications, Mar. 4, 2014.

* cited by examiner

PHOTOTHERMAL MODIFICATION OF HIGH INDEX DIELECTRIC STRUCTURES

CROSS REFERENCE TO RELATED APPLICATIONS

This application is a U.S. National Phase Application of PCT International Application Number PCT/EP2017/084557, filed on Dec. 22, 2017, designating the United States of America and published in the English language, which is an International Application of and claims the benefit of priority to European Patent Application No. 16207500.6, filed on Dec. 30, 2016. The disclosures of the above-referenced applications are hereby expressly incorporated by reference in their entireties.

FIELD OF THE INVENTION

The present invention relates to modification of structures, such as for printing or data storage relying on structural colours, more particularly photothermal modification of high-index dielectric structures and a corresponding product and use thereof.

BACKGROUND OF THE INVENTION

It may be beneficial to provide structures which can serve to yield, e.g., colour or if arranged properly images.

Man-made structural colours, originating from resonant interactions between visible light and manufactured nanostructures, are emerging as a solution for ink-free colour printing.

A method of providing structures, which method is itself improved and/or which yields improved properties of the structures would be advantageous.

SUMMARY OF THE INVENTION

It may be seen as an object of the present invention to provide a method for geometrically modifying structures, such as high-index dielectric structures, on a support structure that may be seen as advantageous, e.g., because it may be carried out in an economic, reliable and fast manner at a very high resolution. Furthermore, it may be seen as advantageous because it enables improved control over the geometry of the resulting photothermally modified structures, yields structures with lower reflectance and/or because it yields improved colour contrast of the resulting photothermally modified structures.

It may be seen as a further object of the present invention to provide an alternative to the prior art.

Thus, the above described object and several other objects are intended to be obtained in a first aspect of the invention by providing a method for geometrically modifying high-index dielectric structures on a support structure, such as printing or recording by the modifying of the high-index dielectric structures, said method comprising:

a. Providing a support structure, such as a support structure with a first plurality of topographical features, such as said topographical features being pillars and/or holes, b. Providing a first plurality of high-index dielectric structures, such as each high-index dielectric structure within the first plurality of high-index dielectric structures being placed on or in or at a corresponding topographical feature, such as a plurality of unit cells each comprising a particle (e.g., a high-index dielectric nanometer sized disk) and a hole (e.g., a nanometer sized hole in a high-index dielectric thin film), said first plurality of high-index dielectric structures being supported by the support structure, such as said first plurality of high-index dielectric structures being in contact with said support structure, such as a two-dimensional plane comprising the first plurality of high-index dielectric structures being adjacent or coincident with a surface of the support structure, c. Changing a geometry specifically of high-index dielectric structures within a second plurality of high-index dielectric structures, wherein the second plurality of high-index dielectric structures is a sub-set of the first plurality of high-index dielectric structures, wherein said changing the geometry is carried out by photothermally melting at least a portion of each of the high-index dielectric structures within the second plurality of high-index dielectric structures by irradiating, such as irradiating via a LASER, such as a narrow band LASER emitting in the visible spectrum, such as via a pulsed LASER, the second plurality of high-index dielectric structures with incident electromagnetic radiation having an incident intensity in a plane of the second plurality of high-index dielectric structures, and thereby exciting resonances associated with each of the high-index dielectric structures within the second plurality of high-index dielectric structures, such as wherein the change in geometry of the second plurality of high-index dielectric structures relies on photon energy being redistributed with optical field confinement and enhancement by the high-index dielectric structures, wherein said support structure comprises a first plurality of topographical features, such as said topographical features being pillars and/or holes, and wherein the first plurality of high-index dielectric structures are given by:

high-index dielectric structures on or in said topographical features, such as on top of said pillars and/or in said holes, and/or holes in a high-index dielectric film, wherein said holes correspond to said topographical features, such as polymeric pillars protruding through the high-index dielectric film.

The inventors have noted the remarkable property of, e.g., weakly absorbing dielectric media, where at resonance, e.g., Ge resonators can absorb significantly more light than that intersecting their physical cross sections. As a result, light can be absorbed by, e.g., spatially isolated (localized) disks when the incident light is spectrally aligned with the optical resonances supported by the nanostructures. This results in a modified reflection spectrum and therefore also colour appearance.

The invention may be particularly, but not exclusively, advantageous for obtaining a method which enables a method for geometrically modifying high-index dielectric structures on a support structure. This may be useful, e.g., for providing structures with certain geometries on a support surface, which may in turn be useful for a number of various purposes, such as printing or data storage. By employing photothermal melting, high-index dielectric structures may be geometrically reshaped by melting, or partial melting, at a very short time scale. By employing an incident radiation of relatively low intensity, it may surprisingly be possible to reshape specific structures within a set of closely spaced structures, which in turn enables, e.g., printing or storage of data, with very high resolution or density (by relying on redistribution of the energy in the incident radiation caused by localized surface plasmon resonance (LSPR)). Furthermore, it may be seen as an advantage, that it enables reshaping the high-index dielectric structures to various degrees, thereby enabling, e.g., colour printing. Furthermore, the invention may be particularly, but not exclusively, advantageous for because it enables improved control over the geometry of the resulting photothermally modified structures, enables yielding structures with lower reflectance and/or because it enables yielding improved colour contrast of the resulting photothermally modified structures.

For example, regarding control over the geometry of the resulting photothermally modified structures, lacking the free conduction electrons (such as with respect to plasmonic structures), the resonance enhanced photothermal process within the high-index dielectrics is more gentle and closer to equilibrium via a homogeneous distribution of the heat within the volume of, e.g., the Ge disk. This contrasts the distribution at the metal surface for plasmonic nanostructures. That non-plasmonic RLP process allows a more stable colour printing which can be operated for full-colour purposes and with the maximum possible resolution of 127,000 DPI.

It is noted, that optical properties of the high-index dielectric structures may be relevant for transmission and/or reflection. For example, if a reflected colour can be seen on top of a surface, another transmitted colour may be seen on the other surface.

In embodiments, the relative permittivity at 532 nm of the first plurality of high-index dielectric structures is equal to or larger than 5, such as equal to or larger than 6, such as equal to or larger than 7, such as equal to or larger than 8, such as equal to or larger than 9, such as equal to or larger than 10.

By 'geometrically modifying' may be understood modifying the geometry, whereby is understood shape, size, and/or relative position of figures. For example it may include changing a sphere into a smaller sphere (size), changing a disk into a sphere (shape and possibly size), changing a disk and hole configuration into a hole without the disk (changing a relative position of figures). It may be understood that the geometric modifications of the high-index dielectric structures may have an effect on their optical properties.

In the present context 'optical' may be understood as relating to within the visible electromagnetic spectrum.

By 'high-index dielectric structures' may be understood structures (e.g., high-index dielectric nanoparticles, holes in a high-index dielectric material, etc.). They may be able to couple with electromagnetic radiation of wavelengths that are larger, such as far larger, than the structures due to resonances. It may be understood that high-index dielectric structures may correspond to a plurality of similar high-index dielectric structures, such as periodically arranged structures, which may optionally each correspond to a plurality of structures (such as a disk and a hole) where the high-index dielectric structures may be divided into unit cells. The 'high-index dielectric structures' may be understood to be solid (at least before and after photo-thermal reshaping).

It may be understood, that the high-index dielectric structures in the first plurality of high-index dielectric strutures, may exhibit a resonance in the visible regime. The resonance may be any one or more of a cavity resonance, an electric dipole resonance, a magnetic dipole resonance and/or a whispering gallery mode resonance.

By 'support structure' may be understood a material supporting the high-index dielectric structures. It may be understood as a solid material whereupon the high-index dielectric structures are placed and/or wherein the high-index dielectric structures, such as each of the high-index dielectric structures within the first plurality of high-index dielectric structures, are embedded.

It is noted that polymer (while polymer may be seen as advantageous, e.g., for allowing topographical features to be provided by nanoimprint lithography) is not essential as choice of material for the support structure, and could in an alternative embodiment be another material, such as glass. Examples of possible polymer materials include TOPAS (COC (cyclic olefin copolymer)), Poly(methyl methacrylate) (PMMA), polyethylene (PE), polystyrene (PS).

The high-index dielectric structures on the solid support structure may form a metasurface.

By 'topographical features' may be understood features on a surface of a material which deviates from the plane of the surface. For example protrusions and indentations, such as pillars and holes.

Topographical features in the support structure may be beneficial for enabling or facilitating providing high-index dielectric structures. For example, if the support structure comprises a plurality of pillars protruding from the surface, then high-index dielectric structures may be directly provided by depositing a high-index dielectric film on the support structure.

In an embodiment there is presented a method, wherein said support structure comprises a first plurality of topographical features, such as said topographical features being pillars and/or holes.

By 'pillars' may be understood protrusions, such as protrusions of a substantially cylindrical shape protruding from a surface.

By 'holes' may be understood indentations, such as indentations of a substantially cylindrical shape into a surface.

For the case of holes and pillars, this may be realized by having pillars of height $t_2$=60 nm, diameter D within, e.g., 60-180 nm, such as 120 nm. The support structure with the pillars may be coated with a high-index dielectric film, such as a germanium film, of a thickness $t_1$=30-50 nm, thereby providing disks with a corresponding height (as thickness $t_1$) on top of the pillars, and holes of corresponding "height" formed as holes in a the high-index dielectric film where the pillars "protrude" it. In case of a periodic arrangement of said pillars, a periodicity A may be given by, e.g., 100-400 nm, such as 200 nm.

By 'specifically' may be understood related to a well-determined set of high-index dielectric structures, such as a pre-determined set of high-index dielectric structures.

By 'the second plurality of high-index dielectric structures is a sub-set of the first plurality of high-index dielectric structures' may be understood that every high-index dielectric structure in the second plurality of structures is also in the first plurality of structures. It may in general be understood that the first plurality of structures is equal to or larger than the second plurality of structures. Thus, the sets may be equal to each other, which may be relevant if all structures should be modified, e.g., in a context of printing, if all pixels should change colour (cf., "bulk" colouring). However, it may also more specifically be understood that the second plurality of high-index dielectric structures is smaller than (not equal to) the first plurality of high-index dielectric structures. This may be referred to as a proper (or strict) subset. This may be relevant for e.g., imaging or data storage, where the arrangement of the geometrically modified second plurality of high-index dielectric structures carries image information and/or data information.

By 'photothermally melting' may be understood melting, or partial melting, of a structure where the energy for raising the temperature from below a melting point to above a melting point (which may or may not be identical to a melting point of corresponding bulk material on a macroscopic scale) originates from irradiation with electromagnetic radiation, such as electromagnetic radiation from within the visible regime.

By the visible regime may be understood electromagnetic radiation (which in this regime may be referred to as 'light') with a wavelength between 380 nm and 760 nm.

By 'at least a portion of each of the high-index dielectric structures' may be understood that some—but not necessarily all—of the (each) high-index dielectric structure (which may correspond to a unit cell, such as a unit cell comprising a hole and a disk) is melted. It may be understood that in embodiments, an individual high-index dielectric structure, such as a unit cell, can be selectively modified.

By 'irradiating the second plurality of high-index dielectric structures with incident electromagnetic radiation' may be understood subjecting the second plurality of high-index dielectric structures with electromagnetic radiation, which electromagnetic radiation—before interaction with the high-index dielectric structures—is referred to as 'incident'.

By 'an incident intensity in a plane of the second plurality of high-index dielectric structures' may be understood the intensity in the plane of the second plurality of high-index dielectric structures before interaction with the high-index dielectric structures.

By 'exciting resonances' may be understood that the incident light for each high-index dielectric structure in the second plurality of high-index dielectric structures excites a localized resonance. The resonance may be any one or more of a cavity resonance, an electric dipole resonance, a magnetic dipole resonance and/or a whispering gallery mode resonance.

In an embodiment there is presented a method, wherein the high-index dielectric structures, such as each of the high-index dielectric structures within the first plurality of high-index dielectric structures, have sizes within 0-1 μm, such as within 10-900 nm, such as within 25-500 nm, such as within 50-400 nm, such as within 60-180 nm, such as 120 nm. By size may be understood the largest dimension.

In an embodiment there is presented a method wherein the first plurality of high-index dielectric structures comprise germanium, such as the first plurality of high-index dielectric structures comprise at least 1 wt % germanium, such as the first plurality of high-index dielectric structures comprise at least 5 wt % germanium, such as the first plurality of high-index dielectric structures comprise at least 10 wt % germanium, such as the first plurality of high-index dielectric structures comprise at least 20 wt % germanium, such as the first plurality of high-index dielectric structures comprise at least 25 wt % germanium, such as the first plurality of high-index dielectric structures comprise at least 30 wt % germanium, such as the first plurality of high-index dielectric structures comprise at least 40 wt % germanium, such as the first plurality of high-index dielectric structures comprise at least 50 wt % germanium, such as at least 75 wt % germanium, such as at least 90 wt % germanium, such as at least 95 wt % germanium, such as at least 99 wt % germanium, such as wherein the first plurality of high-index dielectric structures consist of germanium.

Germanium may be advantageous for its high refractive index while also comprising some attenuation at visible frequencies which is relevant for, e.g., colour generation and laser printing. More particularly, germanium (Ge) may be advantageous because it has the most astonishing optical extinction coefficient among all commonly used high-index dielectric materials in the visible range.

In an embodiment there is presented a method further comprising preparing the topographical features. Preparing the topographical features can be carried out by various methods which may in general be referred to as replication technologies, for example hot embossing, ultrav-violet (UV) nano-imprint lithography (NIL), thermal nano-imprint lithography (NIL), roll-to-roll nanoimprint, roll-to-roll (R2R) extrusion coating, injection moulding.

In an embodiment there is presented a method further comprising
preparing the topographical features by imprinting, such as by nano-imprint lithography (NIL).

In an embodiment there is presented a method further comprising
preparing the first plurality of high-index dielectric structures by depositing a high-index dielectric film on the support structure with the topographical features.

In an embodiment there is presented a method wherein a colour printing or data recording resolution of the geometrically modified high-index dielectric structures on the support structure is below the diffraction limit with respect to the incident electromagnetic radiation, such as colour-pixel printing resolution of 200 nanometres or less, such as colour-pixel printing resolution of 200 nanometres or less. The incident electromagnetic radiation may be within the visible part of the electromagnetic spectrum.

In an embodiment there is presented a method, wherein changing the geometry of a second plurality of high-index dielectric structures, allows storing data, wherein a data storage rate may be given by 1 Gbit/s or more.

In an embodiment there is presented a method wherein a colour printing or data recording resolution of the geometrically modified high-index dielectric structures on the support structure is more than 10 kDPI, such as at least 15 kDPI, such as at least 50 kDPI, such as at least 100 kDPI, such as at least 110 kDPI, such as at least 120 kDPI, such as at least 125 kDPI or higher, such as 127 kDPI. By 'kDPI' is understood kilo dots per inch, i.e., e.g., 10 kDPI is 10,000 (ten thousand) dots per inch.

In an embodiment there is presented a method wherein a reflectance of the second plurality of high-index dielectric structures on the support structure is less than 10%, such as less than 10%, such as equal to or less than 9%, such as equal to or less than 8%, such as equal to or less than 7%, such as equal to or less than 6%. The 'reflectance' may be given within a certain wavelength range, such as within visible regime, such as at a certain wavelength, such as at 532 nm. In a preferred embodiment, the 'reflectance' is the reflectance at 532 nm.

In an embodiment there is presented a method wherein the relative permittivity, such as the real part of the relative permittivity if the relative permittivity is a complex number, of the first plurality of high-index dielectric structures is equal to or larger than 5, such as equal to or larger than 6, such as equal to or larger than 7, such as equal to or larger than 8, such as equal to or larger than 9, such as equal to or larger than 10. It is understood, that the relative permittivity is positive. The 'relative permittivity' may be given within a certain wavelength range, such as within visible regime, such as at a certain wavelength, such as at 532 nm. In a preferred embodiment, the 'relative permittivity' is the relative permittivity at 532 nm. It is noted that unless otherwise stated it is in general understood that when numerical values of 'the relative permittivity' are presented, they correspond to the real part of the relative permittivity (if the relative permittivity is a complex number), such as in the absence of the imaginary unit i which is defined by its property $i^2=-1$.

In an embodiment there is presented a method wherein the high-index dielectric structures on or in said topographical features have lateral dimensions which each exceed a dimension in a direction being orthogonal to a supporting surface of the support structure, such as each lateral dimension exceeding the dimension in a direction being orthogonal to a supporting surface of the support structure by at least a factor of 2.

In an embodiment there is presented a method wherein said incident intensity is less than an incident intensity required to melt a film of a corresponding material and a corresponding thickness as the high-index dielectric structures within the second plurality of high-index dielectric structures.

By 'an incident intensity required to melt a film of a corresponding material and a corresponding thickness as the high-index dielectric structures within the second plurality of high-index dielectric structures' may be understood the intensity which would have been required in order to melt or start melting a film (in the plane of the second plurality of high-index dielectric structures) which film would be made of the same material as the second plurality of high-index dielectric structures (e.g., germanium) and has the same thickness (as measured in a direction being parallel with a direction of propagation of the incident electromagnetic radiation).

It may be seen as a basic insight of the present inventors, that the change in geometry of the second plurality of high-index dielectric structures may be realized by a relatively low incident intensity, since it may rely on photon energy being redistributed with optical field confinement and enhancement by the high-index dielectric structures. It may furthermore be seen as a basic insight of the present inventors, that this effect may be utilized for reducing energy consumption and increasing resolution.

'Thickness' is here given the common meaning of the term, more particularly "the distance between the top and bottom or front and back surfaces of something", such as "between the top and bottom or front and back surfaces". By 'top' and 'bottom' here may be understood opposite parts of the structure with respect to a direction of incident radiation, such as (for incident radiation being in a direction normal to a surface of the support structure upon which the first plurality of high-index dielectric structures are placed) a direction being orthogonal to a surface of the support structure upon which the first plurality of high-index dielectric and/or the plane of the first plurality of high-index dielectric structures. For example, a thickness of a sphere would correspond to its diameter.

In an embodiment there is presented a method wherein said incident intensity is less than 75%, such as less than 50%, such as less than 40%, such as less than 30%, such as less than 25%, such as less than 20%, such as less than 10%, such as less than 5%, such as less than 2%, such as less than 1%, such as less than 0.1%, such as less than 0.01%, of an incident intensity required to melt a film of corresponding material and thickness as the high-index dielectric structures within the second plurality of high-index dielectric structures. In an embodiment there is presented a method, wherein said incident intensity is within 0.01-10%, such as within 0.01-5%, such as within 0.01-1%, of an incident intensity required to melt a film of corresponding material and thickness as the high-index dielectric structures within the second plurality of high-index dielectric structures. Having a relatively low incident intensity may be advantageous for reducing energy consumption and/or increasing spatial resolution and/or increasing the degree of geometrical change which may translate into, e.g., degree of colour change (in a printing context).

In an embodiment there is presented a method wherein the high-index dielectric structures within the second plurality of high-index dielectric structures redistribute photon energy in the incident electromagnetic radiation, thereby enabling said melting.

In an embodiment there is presented a method wherein changing the geometry of specifically the second plurality of high-index dielectric structures, is carried out so as to enable any one or more or all of:
colour mixing
half-toning
dithering.

In an embodiment there is presented a method wherein said support comprises polymer, such as consists of polymer. Polymers may be advantageous due to their flexibility, ease of fabrication and throughput scale-up, which may be relevant for imprinting, such as for nanoimprint lithography. In an embodiment, the polymer is an optically transparent polymer. Optically transparent polymers (such as Ormocomp®) may further enhance the colour visibility and at the same time isolate, e.g, laser-induced, photothermal heating within the high-index dielectric structures, e.g., in a following laser printing processes.

In an embodiment there is presented a method wherein the first plurality of high-index dielectric structures comprise a material being any one of
d. $TiO_2$,
e. $Al_2O_3$,
f. Si,
g. Ge,
h. GaAs,
i. InP
such as the first plurality of high-index dielectric structures comprise at least 50 wt % said material, such as at least 75 wt % said material, such as at least 90 wt % said material, such as at least 95 wt % said material, such as at least 99 wt % said material, such as wherein the first plurality of high-index dielectric structures consist of said material.

In an embodiment there is presented a method wherein changing the geometry of a second plurality of high-index dielectric structures, comprises changing the geometry for high-index dielectric structures within the second plurality of high-index dielectric structures into a plurality of different geometries, such as a plurality of different states being optically different with respect to each other, such as the plurality of different geometries including one or more of: a disk and a hole, a sphere and a hole, a hole, an enlarged hole. According to this embodiment, the second plurality of high-index dielectric structures comprises a plurality of subgroups (where each subgroup comprises one or more structures) and changing the geometry of the second plurality of high-index dielectric comprises changing the geometry for high-index dielectric structures within the subgroups so that the geometry of the high-index dielectric structure(s) within at least one subgroup is different with respect to the geometry of the high-index dielectric structure(s) within at least one other subgroup. A possible advantage of such geometrical change into a plurality of different geometries may be, that it enables having different geometries afterwards, which may be beneficial, e.g., for producing different colours, or for storing more data (e.g., each high-index dielectric structure may comprise more data than merely binary information, such as melted or not melted). The change into different geometries may be controlled, e.g., by controlling the incident intensity. The geometries of the structures in the different subgroups may be identical or different before changing the geometry for high-index dielectric structures within the second plurality of high-index dielectric structures.

In an embodiment there is presented a method, wherein the plurality of different geometries each support a high-index dielectric resonance (such as a limited number of resonances, such as one or two) oscillating at a visible frequency. This may be advantageous for providing multiple, different (visible) colours.

In an embodiment there is presented a method wherein changing the geometry of a high-index dielectric structure within second plurality of high-index dielectric structures is carried out in less than 1 millisecond, such as less than 1 microsecond, such as equal to or less than 100 nanoseconds, such as equal to or less than 10 nanoseconds, such as equal to or less than 1 nanosecond. An advantage of a short timespan here may be that it enables rapidly changing said geometry, which in turn enables, e.g., a fast printing speed or data storage rate.

In an embodiment there is presented a method wherein changing the geometry of a second plurality of high-index dielectric structures, comprises changing the optical characteristics within a visible portion of the electromagnetic spectrum. It may thus be understood, that the geometrical changes may entail visually observable changes, for example a colour change. By 'changing the optical properties' may be understood changing a high-index dielectric resonance within the visible spectrum, such as moving a resonance from one position within the visible spectrum to another position within the visible spectrum.

In an embodiment there is presented a method wherein changing the geometry of a second plurality of high-index dielectric structures is carried out in a manner making the resulting change visible for a normal human viewer, such as the change in optical characteristics is:

a. Spectrally and/or intensity resolvable by the human eye, and/or
b. Large enough to be spatially resolvable by the human eye, such as a distance between changed high-index dielectric structures being at least 10 micrometer, such as at least 20 micrometer, such as at least 50 micrometer, such as at least 60 micrometer, such as 80 dots per cm, such as at least 100 micrometer, such as at least 120 micrometer, such as 160 dots per cm.

In an embodiment, there is presented a method, wherein changing the geometry of a second plurality of high-index dielectric structures takes place by:

Sequentially changing the geometry of different high-index dielectric structures, such as by scanning a spot or line focused laser, or In parallel, such as by projection of an image.

In an embodiment there is presented a method wherein the photo-thermal energy is provided with any one of:

A spot focused LASER,
A spot focused LASER which is scanned through the second plurality of high-index dielectric structures so that changing the geometry is carried out in a sequential manner, A line focused LASER,
A line focused LASER which is scanned through the second plurality of high-index dielectric structures so that changing the geometry is carried out in a sequential manner,
A 2D array LASER
A projected image.

For energy being provided with a LASER, this may be done in combination with scanning mirrors and/or in combination with a motorized stage, for enabling spatially selecting which high-index dielectric structures to geometrically modify. The projected image may be realized with a spatial light modulator, a digital micromirror device (DMD) or a mirror array.

In an embodiment there is presented a method wherein the method further comprises geometrically modifying high-index dielectric structures on a support structure in one or more additional planes comprising additional high-index dielectric structures.

In an embodiment, there is presented a method, wherein the first plurality of high-index dielectric structures is being encapsulated in a solid material before or after changing the geometry of a second plurality of high-index dielectric structures. An advantage of this may be that after encapsulation, the high-index dielectric structures are protected by the encapsulating (optionally transparent) material.

In an embodiment, there is presented a method, wherein the method further comprises geometrically modifying high-index dielectric structures on a support structure in one or more additional planes comprising additional high-index dielectric structures. This may be advantageous for increasing a data storage capacity, e.g., by stacking planes with high-index dielectric structures. This may also or alternatively be advantageous for three-dimensional imaging.

In an embodiment, there is presented a method, wherein the first plurality of high-index dielectric structures are present on a lens.

'Lens' is understood as is common in the art, such as a transmissive (refractive) or reflective optical device that focuses or disperses a light beam by means of refraction or reflection.

In a further embodiment, the method comprises a step of placing the first plurality of high-index dielectric structures on a lens, such as via imprinting. The step of placing the first plurality of high-index dielectric structures on a lens may take place prior to the step changing a geometry specifically of high-index dielectric structures within a second plurality of high-index dielectric structures.

In an embodiment, there is presented a method wherein the lens is an ophthalmic lens. 'ophthalmic lens' is understood as is common in the art, such as wherein both the front and back surface have a positive radius.

In an embodiment, there is presented a method wherein the first plurality of high-index dielectric structures are present on a lens, wherein said lens is a. a lens for a pair of glasses, such as wherein said lens is present in a pair of glasses, or
b. a contact lens (such as a lens suitable for being placed directly on the surface of the eye of a normal human).

In specific embodiments, the lens, such as the ophthalmic lens, may be any one of:

A single vision lens,
A digital lens,
A progressive lens,
A lens for computer glasses,
A spectacle lens,
A sunglass lens,
A sport lens, A lens for snow goggles,
A lens for computer glasses,
A self-tinting lens,
A polarized lens,
A progressive lens,
a bifocal lens,
a trifocal lens,
a multifocal lens, and
a photochromic lens.

According to a second aspect of the invention, there is presented a product comprising:
- a. A support structure,
- b. A first plurality of high-index dielectric structures, said first plurality of high-index dielectric structures being supported by the support structure,
- c. A second plurality of high-index dielectric structures, wherein the second plurality of high-index dielectric structures is a sub-set, such as a proper sub-set, of the first plurality of high-index dielectric structures, wherein a geometry specifically of the second plurality of high-index dielectric structures may be changed, wherein said changing the geometry may carried out by photothermally melting at least a portion of each of the high-index dielectric structures within the second plurality of high-index dielectric structures by irradiating the second plurality of high-index dielectric structures with incident electromagnetic radiation having an incident intensity in a plane of the second plurality of high-index dielectric structures and thereby exciting resonances associated with each of the high-index dielectric structures within the second plurality of high-index dielectric structures,
wherein said support structure comprises a first plurality of topographical features,
and wherein the first plurality of high-index dielectric structures are given by:
- high-index dielectric structures on or in said topographical features,
- and/or
- holes in a high-index dielectric film, wherein said holes correspond to said topographical features.

In embodiments, the relative permittivity at 532 nm of the first plurality of high-index dielectric structures is equal to or larger than 5, such as equal to or larger than 6, such as equal to or larger than 7, such as equal to or larger than 8, such as equal to or larger than 9, such as equal to or larger than 10.

In further embodiment there is presented a product wherein a geometry of each high-index dielectric structure within the second plurality of dielectric structures is different with respect to each high-index dielectric structure within the first plurality of high-index dielectric structure which is not within the second plurality of dielectric structures In an embodiment there is presented a product wherein the product furthermore comprises a lens and wherein the first plurality of high-index dielectric structures are present on the lens.

In an embodiment there is presented a product wherein the lens is an ophthalmic lens.

In an embodiment there is presented a product wherein the product furthermore comprises a lens and wherein the first plurality of high-index dielectric structures are present on the lens, wherein said lens is a lens for a pair of glasses.

In an embodiment there is presented a product wherein the product furthermore comprises a lens and wherein the first plurality of high-index dielectric structures are present on the lens, wherein said lens is a contact lens (such as a lens suitable for being placed directly on the surface of the eye of a normal human).

In an embodiment there is presented a pair of glasses, wherein the pair of glasses comprises
- a lens wherein the first plurality of high-index dielectric structures are present on the lens,
- an ophthalmic lens wherein the first plurality of high-index dielectric structures are present on the lens, or
- a lens and wherein the first plurality of high-index dielectric structures are present on the lens, wherein said lens is a lens for a pair of glasses.

According to a third aspect of the invention, there is presented use of
- a product comprising geometrically modified high-index dielectric structures provided according to the method according to the first aspect, or
- a product according to the second aspect, for any one of:
- Macroscopically printing, such as printing visually observable text or images,
- Microscopically printing, such as printing microscopic data for security purposes,
- Storing data,
- Assessing laser power,
- Sensing,
- Focusing a beam of electromagnetic radiation,
- Dispersing a beam of electromagnetic radiation.

For example, laser power may be assessed by carrying out the method and observing a colour of the second plurality of high-index dielectric structures afterwards, which colour may correspond to a geometrical change caused by a given incident laser intensity, which can then be ascribed to the laser subjected to assessment.

According to a fourth aspect of the invention, there is presented a product as obtained via a method according to the first aspect.

The first, second, third and fourth aspect of the present invention may each be combined with any of the other aspects. These and other aspects of the invention will be apparent from and elucidated with reference to the embodiments described hereinafter.

BRIEF DESCRIPTION OF THE FIGURES

The method for geometrically modifying high-index dielectric structures on a support structure according to the invention will now be described in more detail with regard to the accompanying figures. The figures show one way of implementing the present invention and is not to be construed as being limiting to other possible embodiments falling within the scope of the attached claim set.

DETAILED DESCRIPTION OF AN EMBODIMENT

Figure 1:
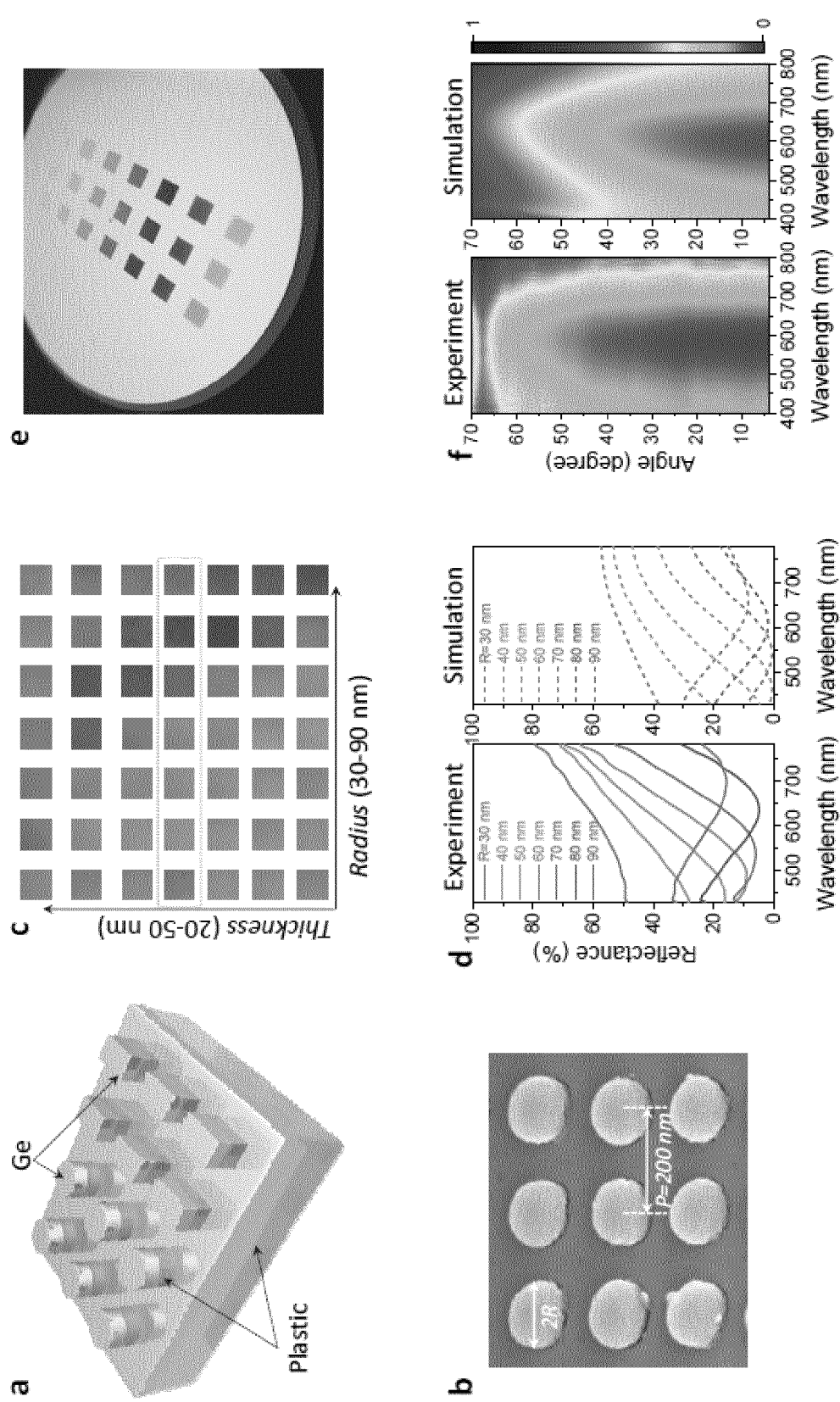
FIG. 1 shows structural colours based on high-index dielectrics.

A schematic representation of the structures is provided in FIG. 1a, where a thin film of Ge is deposited on a substrate with nano-imprinted polymer pillars. In this way, dielectric disks can be raised above a same-thickness dielectric film representing an inverse of the disk array, i.e. a high-index dielectric film with 'holes' penetrated by low-index pillars. We note that both disks and holes inherit their common topology from that of the polymer pillars and as thus one can also make other cross sections such as bars. Ge was selected for its high refractive index, while also comprising some attenuation at visible frequencies which is essential for the ultimate colour generation and laser printing that we describe. In particular, high-index materials can be used for these structural colour generations, which are multifunctional and potentially environment-inert.

Polymer substrates were preferred here for their flexibility, ease of fabrication and throughput scale-up in nanoimprint lithography. Optically transparent polymers (here Ormocomp® is considered) can further enhance the colour visibility and at the same time isolate the laser-induced heating within the on-top lossy materials in a following laser printing processes. The scanning electron microscope (SEM) image of a small selected area of the nanostructures after Ge deposition is shown in FIG. 1b, which illustrates the fixed periodicity P=200 nm of the lattice and the radius R of the disks in our design. The interaction of light within the hybrid disk-hole structure can be enhanced dramatically, by trapping light with multiple total internal reflections. Dipole resonance conditions can be fulfilled for subwavelength structures made of high-index materials. We note the remarkable property of weakly absorbing dielectric media, where at resonance e.g. Ge resonators can absorb significantly more light than that intersecting their physical cross sections. As a result, light can be absorbed by the spatially isolated (localized) disks when the incident light is spectrally aligned with the optical resonances supported by the nanostructures. This results in a modified reflection spectrum and therefore also colour appearance.

Subwavelength localization of light is naturally provided by plasmonic nanostructures, while high refractive index dielectrics may also manipulate light on length scales beyond its wavelength. The resonant wavelengths in high-index dielectric cavities intuitively follow the picture of whispering-gallery-like modes, where the effective wavelength of the trapped light is related to the geometry of the cavities. Here, we note an important difference with plasmonic structures that share the same overall geometry, while the dielectric film is replaced by a metallic film. In the plasmonic case, localized disk resonances hybridize through near-field coupling with hole-plasmon resonances that are spatially localized too, i.e. with a mutual spatial overlap. On the other hand, in our dielectric case the holey film acts as a void-type slab photonic crystal with delocalized low-frequency states predominantly occupying the high-index region of the layer, while hardly penetrating into the low-index hole regions. Consequently, disk modes have a modest field-overlap with modes in the photonic crystal film and the response can largely be understood from the disk dipole modes supported by the array of dielectric disks itself. In addition to electric dipole resonances, magnetic dipole resonances can also be supported in these structures. This very property makes the high-index dielectric resonators a diverse system with additional degrees of freedom. For example, by controlling the height and the radius of the disk one may achieve a tunable double resonance characteristics, a property which may help further improve the spectral response and in turn the colour appearance. For the realization of large-area metasurfaces, such dielectric nanoparticles can be printed onto surfaces using laser-based methods, while we here lean against approaches in the first place developed for production of plasmonic colour metasurfaces.

By systematically varying the disk parameters, like the disk radius R and the film thickness T (while keeping the height of the pillar H=60 nm fixed), we achieve a full palette of colours that span the visible range, as shown in FIG. 1c. The measured reflection spectra for Ge films of thickness T=35 nm coated on the pillars with R=30-90 nm are presented in FIG. 1d (left), which demonstrates broadband absorption resonances with the spectral position determined by the radius of the disks. The wide optical absorption band creates the high-contrast colour by suppressing a portion of the reflectivity in the visible spectrum down to the 5% reflection level. The corresponding simulated reflection spectra are shown in FIG. 1d (right), which show qualitative agreement with the experimental results. Note that a protective coating will sightly redshift the resonances in our system, thereby causing a relatively small colour change as a result of the increased surrounding refractive index. To appreciate the importance of localized resonances within the subwavelength structures, the optical properties are preserved with respect to the angle of light incidence. FIG. 1e shows a photograph of a sample taken at a large oblique angle. As the resonators are much smaller than the wavelength of light, the supported localized resonances ensure the reflected colours from these structures to be robust with respect to the angle of incidence.

We further demonstrated this by measuring and simulating the angle-resolved reflectivity of a sample, which shows that the absorption feature remains prominent for angles of incidence from normal incidence up to 60°, see FIG. 1f. In addition to the structure-generated static colours, there is also an interest in post-processing and dynamical re-configuration of colours. Plasmon resonances in metal nanostructures are known to offer the capability of confining the optical excitation far beyond the diffraction limit.

This can be utilized for greatly enhancing the photothermal effect and it was explored for plasmonic colour laser printing where plasmonic heating locally melts and reconfigures the metallic nanostructures. Obviously, plasmonic heating is closely linked to field confinement at metal surfaces, with limited access to structural melting that emerges from a material's bulk response. Furthermore, plasmonic resonances may also provide the particles with a repulsive momentum from the surface, leading to a random offset of the particles at printing. In optical heating, the absorbed heat power density reflects the electric field distribution E in the resonator, i.e., $q_{abs}=\frac{1}{2}\omega\varepsilon''|E|^2$, where $\omega$ is the angular frequency, while $\varepsilon''$ is the imaginary part of the dielectric function $\varepsilon=\varepsilon'+i\varepsilon''$ of the resonator material. Optically, dielectrics differentiate themselves from metals by being largely transparent at the frequencies of interest. As such, we usually associate dielectrics of high optical quality with $\varepsilon'>>\varepsilon''\cong 0$. In this aspect, semiconductors like Si and Ge are high-index dielectrics with $\varepsilon'>>1$, while above-bandgap absorption provides a significant damping in the visible, with $\varepsilon''$ for Ge being comparable to that of Al in the visible region. Thus, we anticipate opportunities for localized dielectric heating and melting-induced morphology changes of Ge nanostructures, with possible parallels to plasmonic heating utilized for plasmonic colour laser printing. Here, the more evenly distributed light energy in the dielectric resonators will potentially heat the resonator volumes more homogeneously. The associated heat-driven morphology changes might in turn be more controllable, thus allowing us to realize the long-standing goal of ink-free, high-speed and sub-diffraction full-colour laser printing in an entirely dielectric material architecture.

Figure 6:
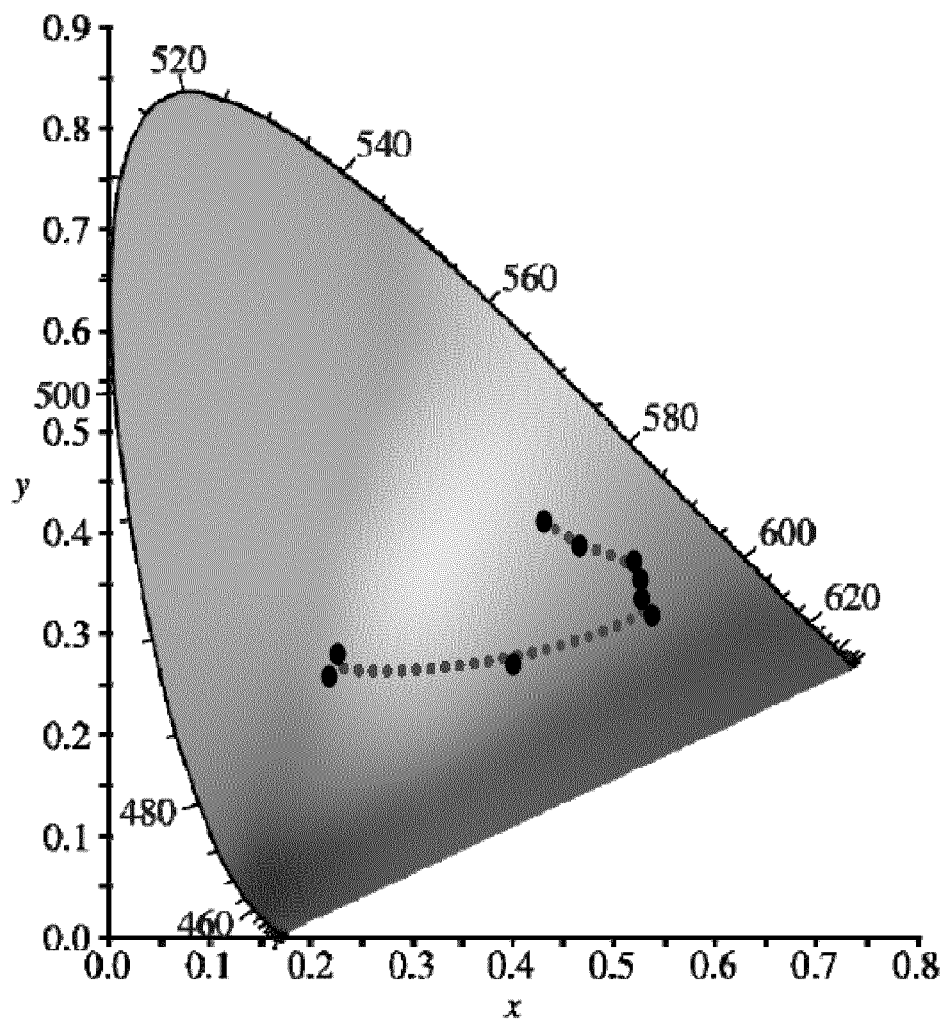
FIG. 6 shows a gamut loop of laser printed structural colours.

Laser heating is generally of a random stochastic nature because of the complex thermodynamic phase transitions in the materials. When the incident laser frequency is close to an optical resonance of the structure, the frequency coincidence (or resonance) can promote greatly enhanced absorption of electromagnetic energy, which facilitates the ultra-low power consumption and frequency selectivity in laser printing. Consider a morphology-dependent optical resonance, which is driven resonantly by a pulsed laser. Because the resonance frequency depends critically on the detailed morphology of the resonator volume, the on-resonance pulsed laser should only provide little energy dissipation to slightly change the morphology, i.e. from an initially flat disk in the direction of a spherical shape, thus also shifting the spectral response into an off-resonance state. The heating is consequently weakened and reshaping of the morphology discontinuous. This optical resonance-based selectivity provides distinct power targets for generating identical structural colours by well-controlled photothermal reshaping processes, which offer easier colour selecting and halftoning. FIG. 2a illustrates the setup for resonance-laserprinting (RLP) of structural colours. We used the selectivity of RLP to achieve resonance-mediated structural colour printing governed by photothermal reshaping. FIG. 2b presents the reflective and transmitted optical microscope images of the resulting colours, showing gradual colour change from cyan to yellow when the applied laser irradiation with single nanosecond laser pulses is linearly increased (pulse energy of 0.2-1.8 J in the focal plane). We acquired scanning electron microscope (SEM) images after laser heating with different energy doses (FIG. 2c). As seen, the laser heating within the Ge resonators gives well-defined reshaping of structures, while plasmonic laser heating, as employed recently for plasmonic colour printing, might result in particles being propelled away from the interface owing to the intense laser field and a rapid thermal change at the metal surface during the melting process. FIGS. 2d and 2e are the measured and simulated spectral data corresponding to each RLP of colour squares in FIG. 2b. Spectral features blueshift as a result of the gradual decrease of the disk's diameter. It should be mentioned that the colours generated by RLP can well cover cyan, magenta, and yellow (CMY) gamut as represented in a CIE-1931 chromaticity diagram (FIG. 6). To demonstrate the working principle of RLP, we printed several macroscopic images in various colour tones, which are shown in FIG. 2f. All pictures are clearly visible and can be recorded using a commercial camera (Canon EOS). The striking colour appearance and contrast demonstrate the feasibility of our RLP scheme on such ultra-thin, flexible and laser printable metasurfaces that work as printable 'paper'.

We also demonstrate full CYM colour half-toning abilities of our RLP approach, which is a normal component of traditional laser printers. The full capability of the structural colour laser printing is exemplified in FIG. 2g by printing a colourful portrait of Niels Bohr. The original (subpanel i) and the corresponding CYM half-toning (subpanel ii) exhibit a mixture of all three base CYM colours. During the RLP process, the intensity of the magenta colour is gradually tuned on the cyan background (subpanel iii). The final full-colour printed portrait (subpanel iv) closely matches the original image (subpanel i). In most commercial ink-jet or laser printers, a black K ink (Key ink) is also included, resulting in the CMYK colour scheme. The K ink is needed for 8 improving the image sharpness due to the imperfect transparency of commercially practical CMY inks. However, structural colour printing processes almost never include a black component (which would imply total optical absorption). Interestingly, for structural colours employing high-index lossy dielectrics, the intrinsically large optical attenuation within the material leads to already strong resonant absorption (resulting in high-contrast colours) inside the structured films, which can be as thin as tens of nanometers. In our structural colour laser printing processes, the printed CMY colours are almost perfectly reflective. A highly saturated CMY combination successfully leads to a half-toned black colour, as show in FIG. 2h. Our results have immediate implications for ink-free colour decoration industry labeling and packaging, while we also anticipate use for visual commodity, arts and personal accessories with customized designs.

Super-resolution printing for colour filtering has possible applications in retina displays for portable devices. We achieve a sub-diffraction printing resolution of RLP, which is eventually limited by the lattice constant P of our metasurface. Our particular case with a 200 nm pitch translate into a resolution in excess of 120,000 (120 k) dots-per-inch (DPI), with a corresponding pixel being up to 500 fold smaller than the cross section of a human hair. We now discuss how we address a single resonator in our RLP, see FIG. 3a. The resolution of a traditional microscope used in laser printing (based on a lens for visible light), is limited by diffraction to $\sim\lambda/2/NA$, where in our case $\lambda=532$ nm and with numerical aperture NA≤0:85 (subpanel I). RLP easily exceeds the diffraction limit of conventional optical microscopy. The localized resonators provide a large field enhancement (subpanel II) and a periodical redistribution of the optical energy densities by confining the optical energy within the high-index volumes (with high density of optical states) which are far beyond the diffraction limit. This spatial power enhancement and modulation of the Gaussian-like beam allows an effective printing area with a sub-diffraction-limited scale, due to a threshold in the energy needed to drive morphology changes (subpanel III). Thus, we can print an ultimate structural colour pixel by only addressing the resonator associated with a single unit-cell, while the energy dissipated in neighboring unit cells would not exceed the threshold for morphology changes, see FIG. 3b. To demonstrate the sub-diffraction resolution colour-laser-printing capability, massive patterns were drawn on samples with T=35 nm and R=70 nm, 80 nm, and 90 nm. FIG. 3c shows a collection of images printed with the sub-diffraction resolution of 127,000 (127 k) DPI. RLP was done at a speed of 1 min per image (only limited by the translation of the mechanical stage). The images (with 62,500 pixels) are 50 μm by 50 μm each, being even smaller than a single pixel of the latest Retina HD Display technology (63 m). With cutting-edge RLP technology, the homogeneous field distribution of resonances inside the particles makes it possible to rapidly heat and modify these nanostructures with an incredible accuracy. As shown in the SEM image in FIG. 3d, our RLP of the Parthenon temple discloses the laser printed sub-diffraction features being beyond reach of traditional microscopes. FIG. 3e shows a high-magnification image (subarea with fine features indicated in FIG. 3d), illustrating the morphology transition of each particle due to the single unit-cell laser printing.

In order to highlight the potential for future applications, particularly in the 3D display or encryption purposes, a polarization sensitive colour palette is also employed to create complex images by RLP at resolutions beyond the diffraction limit. By simply elongating the disks into bars (FIG. 4a), we show that the asymmetric structures can support tunable colour under polarized incident light in the visible spectrum in a similar way to plasmonic structures. When lifting the local cylindrical rotational symmetry, the response our electric and magnetic dipole modes becomes polarization dependent and colours can be switched continuously through polarization tuning, FIG. 4b. The application of RLP to asymmetric structures can easily render asymmetric resonators into morphologies of higher symmetry, i.e. bars into spheres, as the latter is favored by a lower surface energy. The transition from Ge bars into spheres and eventual ablation (FIG. 4c) offers new degrees of freedom for structural colour applications. Examples of laser printed patterns are shown in FIG. 4d with polarization-dependent colour appearances. These patterns have been printed with a resolution of 100,000 DPI (limited by the unit-cell of 250 nm by 250 nm). Polarization-dependent laser printing allows for the encoding or hiding of colour information within a single layer of structured surface. By varying the Ge film thickness (here T=30 nm), we can modify the polarization-dependent optical responses of the laser printed structures, making the optical resonances of transverse modes for bars, shortened bars, spheres and holes all located at the same frequencies, resulting in the same colour printings. As shown in FIG. 4e, the printed pattern vanishes within the brownish background when the surface is illuminated by 90° polarized light, as all resonances produce colours resembling the current colour of the background. We believe that RLP of a full-colour high-resolution image, that can markedly change its appearance under orthogonal polarization illuminations, may pave the way for new functional colour displays, security labels and optical data storage applications.

In summary, we have demonstrated a unique structural colour platform based on structured high-index dielectrics. Our realization of vivid and non-iridescent structural colours pave the way for a new class of materials for structural colour generation that are ultra-thin, fully flexible and environmentally inert. In contrast to plasmonic heating, our work harvests from above-bandgap absorption, representing the first applications of laser printable structural colours with all-dielectric materials. With appropriately designed dielectric resonances, sufficient optical attenuation in the visible range allows resonant absorption of laser pulses. Thus, in practice, instantaneous heating and subsequent morphology relaxation of resonators allow ultra-fast laser printing of full-colour images with ultrahigh resolution. We demonstrate the high selectivity of printed colours by RLP, with examples of pure-colour printing and high-contrast CYM halftonings. While we have employed the visible absorption of Ge, RLP would also work with absorption bands beyond optical frequencies, while the 'full' transparency of the visible band itself would facilitate even higher colour vibrancy. Furthermore, we demonstrate the ultimate print resolution offered by RLP. Because of the sub-diffraction spatial field modulation from the periodically arranged localized resonators, such structures enabled the print of colours with a resolution exceeding 100,000 DPI, with the possibility for polarization controlled colours. Our demonstrations open up new potential applications ranging from packaging and displaying to encryption, data storage and retina devices.

Methods

Sample preparation. To fabricate the Si master for nanoimprint, a resist coated Si wafer was exposed by electron-beam lithography (JEOL JBX-9500FS 100 keV prototype) and then dry etched. The Si stamp coated with an antistiction coating was employed for replicating the pillar structure via room temperature nanoimprint into the Ormocomp® layer. The Ormocomp® film was cured by exposure to UV light and separated from the Si master and peeled from the Borofloat glass substrate afterwards. Subsequently, a Ge film was deposited by an electron beam evaporator at 5 Å/s after imprint under a process pressure of ~$10^{-6}$ mbar. A sufficiently thick layer of PMMA (10% 950PMMA in Anisole, MicroChem Corp) can be spin-coated on top to protect the samples.

Optical setups. The optical setup for laser colour printing comprises a Nikon Ti-U inverted microscope where a laser (CryLaS FDSS532-150) emitting 1 ns pulses at 532 nm is used for printing. The laser pulse energy is controlled and rapidly modulated with a liquid crystal attenuator. The sample was mounted on a computer-controlled piezo nanopositioning stage (Mad City Labs Nano H50 series piezoelectric stage, 0.1 nm resolution, 50 µm travel, XY axes), which was placed on a computer-controlled motor stage. The same optical setup is employed for spectroscopic imaging and measurements by combining an imaging spectrometer with a 300 g/mm grating (Andor Shamrock 303i and Newton 920 CCD with 256 1024 pixels). Optical micrographs were acquired using a Nikon Eclipse L200 microscope with a Nikon digital camera (DS-Fi1). Macro-photographs were taken by a commercial digital camera (Canon EOS Mark-II series).

Numerical simulation. The optical response of our structures were simulated in a commercially available electrodynamic simulation package (CST microwave studio), using a finite-element method for reflection spectra and field distributions of structures under different illumination conditions. For simulations of the photothermal reshaping processes, we used a simplified model of the complex thermodynamic phase transition. Neglecting gravity, we varied the thickness of round-cornered disks (to the final spherical shape), while preserving the overall initial material volume of the disks. An EM-thermal co-simulation approach was further used in order to solve the coupled electromagnetic and heat transfer problems.

Results

FIG. 1 shows structural colours based on high-index dielectrics. a, Schematic demonstration of the structures. b, A 45 side-angle SEM image of imprinted plastic structures after Ge deposition. Colour information is presented for clarifying the diameter and spacing of the nanopillar structure. c, Full palette of colours is revealed in an array of squares. By varying the radius of the pillars and the deposited Ge film thickness, structures with the same periodicity display a wide range of colours (from bottom right to top left). The highlighted row was measured to produce the experimental reflection spectra in FIG. 4d. d, Selected experimental and simulated spectra for Ge films of thickness T=35 nm. The dips shift to longer wavelengths with varying radius of the nanostructures from R=30 nm to 90 nm. e, Taken at 60 side-angle, optical photo of the an imprinted four-inch sample following deposition of thin Ge layers with uniform thickness of T=40 nm, showing the colour rendition of 5 mm by 5 mm squares similar to the third row in (c). f, Experimental and simulated reflection spectra for angles of incidence from 4° to 70° for a sample with T=35 nm and R=75 nm (reflectivity is indicated by colour bars).

Figure 2:
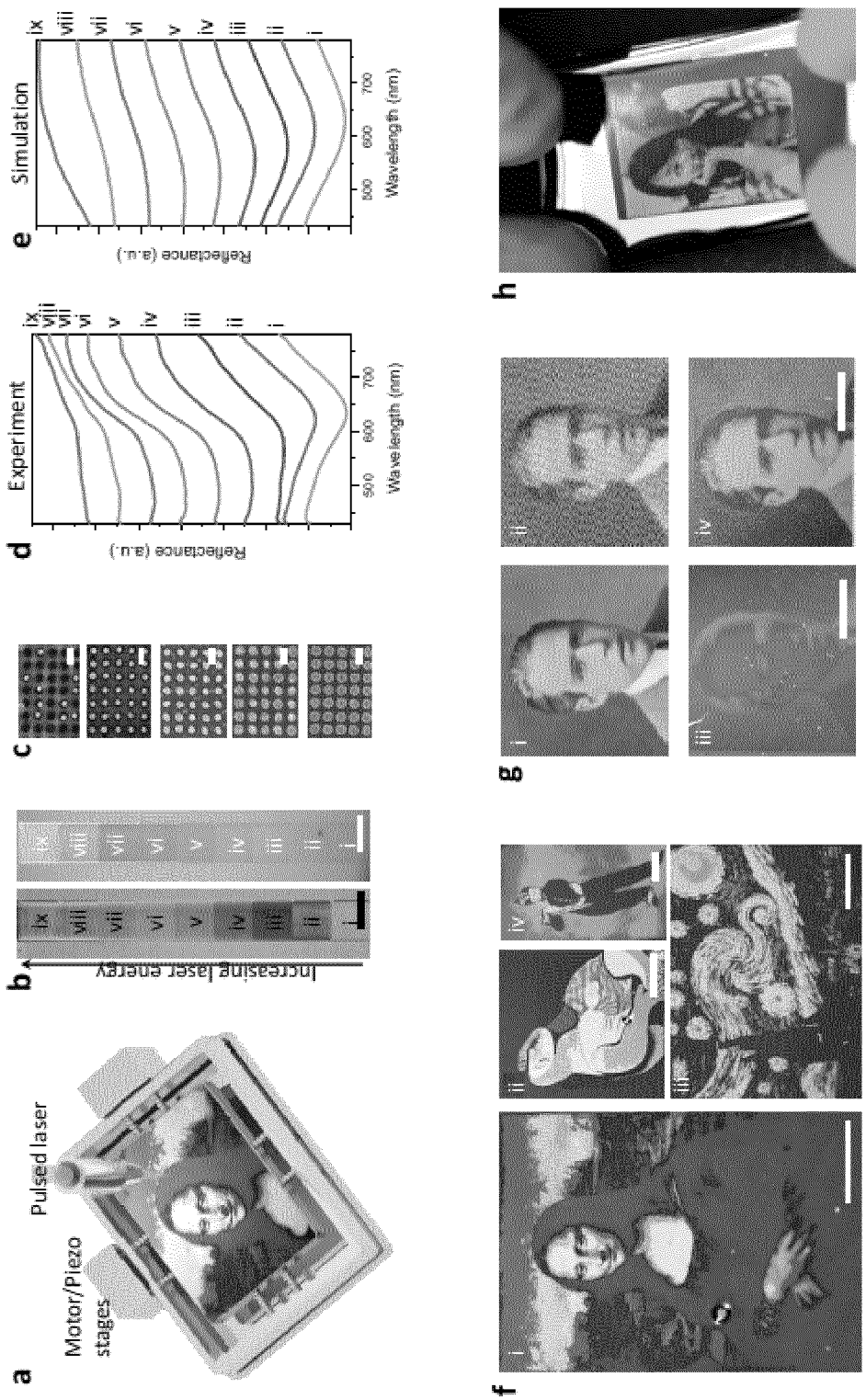
FIG. 2 shows macroscopic resonance-laser-printing of structural colours.

FIG. 2 shows macroscopic resonance-laser-printing of structural colours. a, Schematic setup of RLP. Synchronous motion solution with the laser pulses is provide by computer-controlled motor or piezo stages. b, Reflection and transmission micro photos of multi-coloured structures generated by gradually increasing laser powers. Microstructures (subpanels i-ix) are generated under gradually increasing laser power strengths from 0.2 J to 1.8 J in steps of 0.2 J controlled by a liquid crystal attenuator (scale bars: 0.5 mm). c, Corresponding SEM images of the microstructures (subpanels i, iii, v, vii and ix) in b, showing the change of the morphology of the unit-cell from disk to sphere and eventually a hole (scale bars: 200 nm). d, Experimental reflection spectra of the corresponding laser printed colour squares in b. Note that the dips (absorbed light) with varying printing laser powers blueshift, causing colour changes from cyan to yellow. e, The corresponding simulated reflection spectra. f, A collection of laser printed paintings with protective PMMA coating (sufficiently thick to suppress Fabry-Pérot interference) deposited prior to laser printing. Samples have R=135 nm with deposited Ge film thicknesses of T=45 nm (i), 40 nm (ii), 35 nm (ii), and 30 nm (iv), respectively (scale bars: 5 mm). g, Photograph of a colourful portrait (i); CMY halftoning of the original image (ii); printing of halftoned magenta colour onto the initial cyan background (iii); laser printed full-colour CYM halftoned image (scale bars: 5 mm). h, Structural colour laser printing of a portrait photo. CMY halftoning realizes red, brown and especially a saturated black colour.

Figure 3:
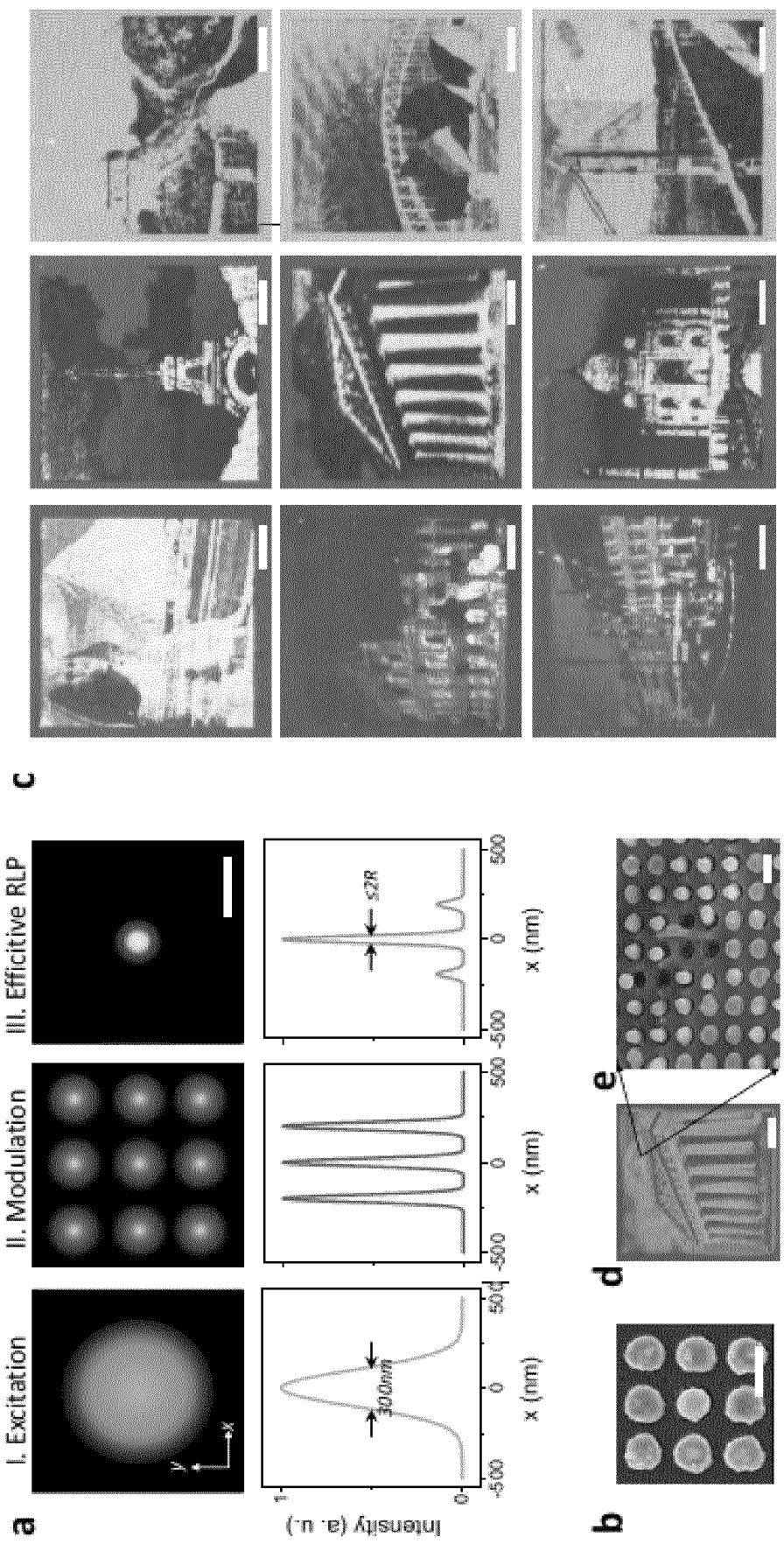
FIG. 3 shows a mechanism and result of the super-resolution RLP.

FIG. 3 shows a mechanism and result of the super-resolution RLP. a, Mechanism of the formation of a focal spot by overlapping the excitation beam and the periodical resonator array. A Gaussian excitation beam with low power (i) is enhanced and modified by the periodical resonators supporting highly confined localized resonances (ii), producing an effective photothermal heating area smaller than a diffraction-limited spot (iii). The original laser power for super-resolution printing should not exceed the threshold for melting an unstructured Ge thin film, while the locally enhanced energy density should overcome the threshold to initialize photothermal reshaping processes. b, SEM image presents the RLP within a single unit-cell, addressing the morphology change of the centered particle (scale bar: 200 nm). c, RLP images with a resolution of 127,000 DPI (127 k DPI). The samples are with T=35 nm and R=70 nm (left), 80 nm (middle), and 90 nm (right), respectively (scale bars: 10 μm). d, SEM image of a RLP image in c, which shows details of the structure and the corresponding electron scattering changes induced by laser printing (scale bar: 10 μm). e, SEM image of an enlarged region of the image in d, showing the remarkable detail and morphology change on a single unit-cell level. These modified unit-cells exhibit different colours in the optical image due to a RLP induced variation in nanodisk sizes as well as the ablation of the disks.

Figure 4:
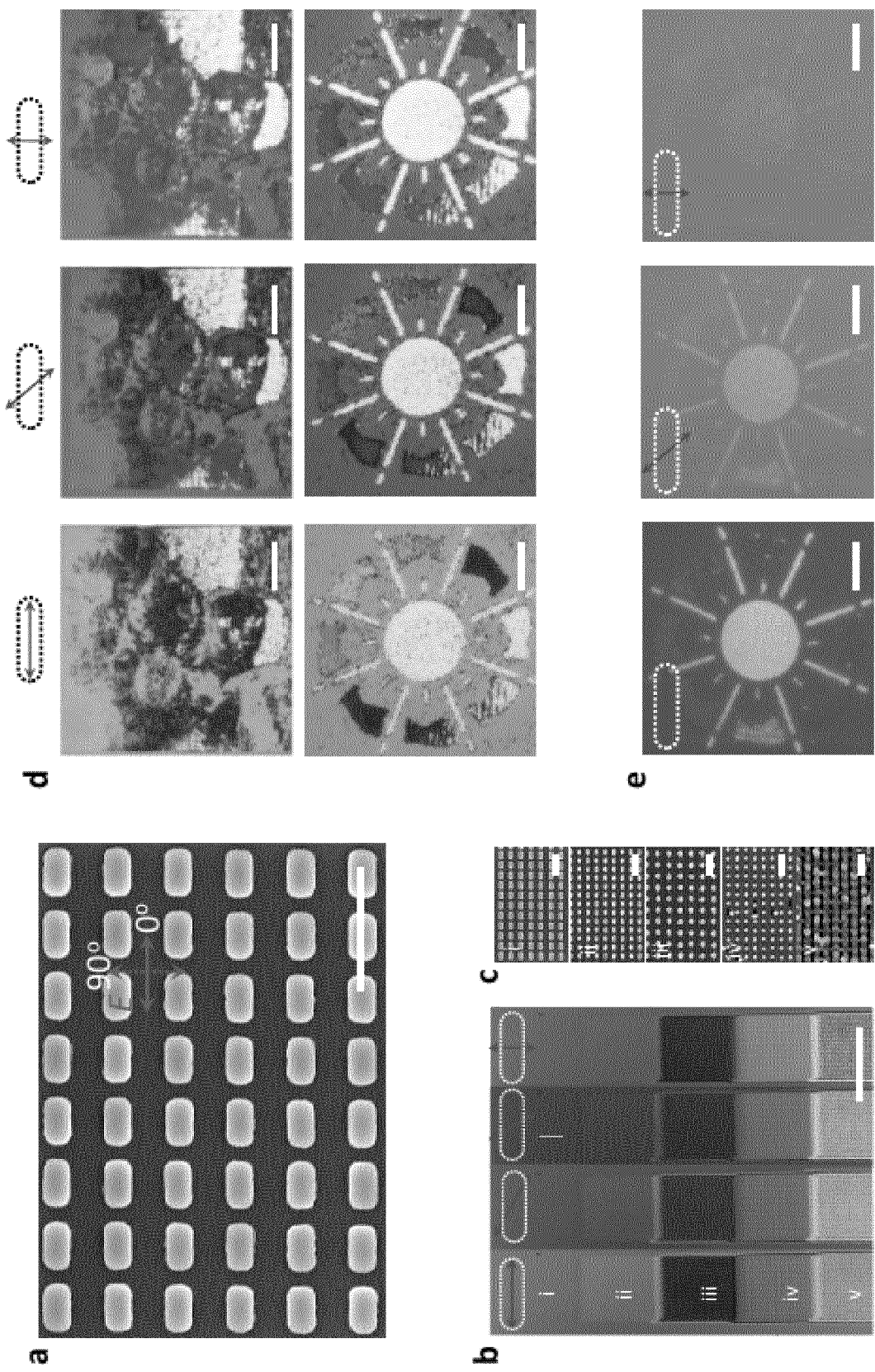
FIG. 4 shows polarization-sensitive RLP colour generation.

FIG. 4 shows polarization-sensitive RLP colour generation. a, SEM image of bar-hole structure presents the geometry parameters for polarization-sensitive RLP colour generation. The dimensions of the long and short axises and the height of the plastic pillars are 90 nm, 55 nm, and 50 nm, respectively. By varying the deposited Ge film thickness, we can still tune the colour appearances as well as the strength of the polarization-dependent optical responses. Inset shows the polarization information, where the 0° polarized light field will excite the longitudinal mode along the long axis of the resonator while the 90° polarized light field will excite the transverse mode along the short axis (scale bar: 500 nm). b, Optical images of colour palettes printed by different laser power dosages illuminated under 0° to 90° polarized light. Note that switching in polarization-dependent colours is more feasible in low-power printed colours (scale bar: 500 μm). c, Corresponding SEM images of the laser printed structures in b, which show the gradual morphology change of the structures from bars to shorten bars and then to spheres and finally to holes. d, Optical images of laser printed pictures from a sample with Ge film thickness of T=45 nm illuminated under 0°, 45° and 90° polarized light, respectively, which show polarization-sensitive colours (scale bar: 10 μm). d, Optical images of a laser printed picture from a sample with Ge film thickness of T=30 nm illuminated under 0°, 45°, and 90° polarized light, respectively (scale bar: 10 μm). The laser printed pattern shows high colour contrast under 0° polarized light, but vanished under 90° polarized light illumination.

Figure 5:
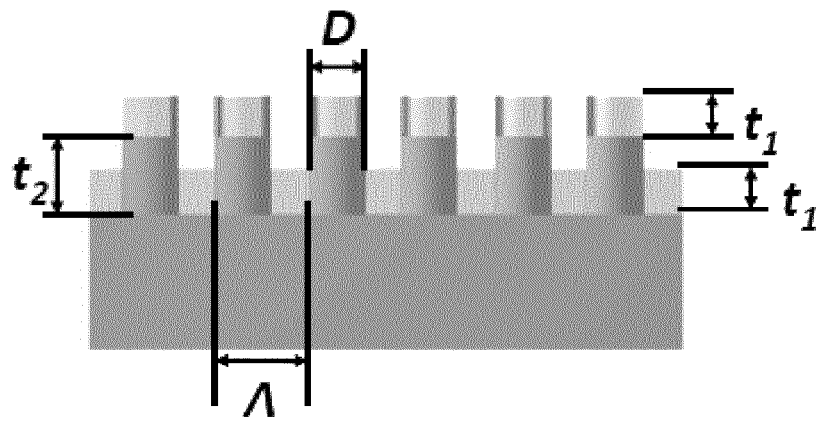
FIG. 5 shows a sample according to an exemplary embodiment with pillars.

FIG. 5 shows a sample according to an exemplary embodiment with pillars (with height $t_2$) in a support structure, where they are arranged with periodicity Λ, a high-index dielectric film (with thickness $t_1$) deposited thereon, and the resulting high-index dielectric disks and holes (each with corresponding thickness $t_1$).

FIG. 6 shows a gamut loop of laser printed structural colours, which covers cyan, magenta and yellow colours.

In an alternative example there is presented a method for geometrically modifying high-index dielectric structures on a support structure, said method comprising:
  a. Providing a support structure,
  b. Providing a first plurality of high-index dielectric structures, said first plurality of high-index dielectric structures being supported by the support structure,
  c. Changing a geometry specifically of high-index dielectric structures within a second plurality of high-index dielectric structures, wherein the second plurality of high-index dielectric structures is a sub-set of the first plurality of high-index dielectric structures,
wherein said changing the geometry is carried out by photothermally melting at least a portion of each of the high-index dielectric structures within the second plurality of high-index dielectric structures by irradiating the second plurality of high-index dielectric structures with incident electromagnetic radiation having an incident intensity in a plane of the second plurality of high-index dielectric structures, and thereby exciting resonances associated with each of the high-index dielectric structures within the second plurality of high-index dielectric structures,
wherein the first plurality of high-index dielectric structures comprise germanium, such as wherein the first plurality of high-index dielectric structures consist of germanium.

This alternative example may be combined with features of any embodiment of the invention, such as features described in embodiments and/or dependent claims, such as features which are not described in the independent claims.

In separate embodiments E1-E16 there is presented:
  E1. A method for geometrically modifying high-index dielectric structures on a support structure, said method comprising:
    a. Providing a support structure,
    b. Providing a first plurality of high-index dielectric structures, said first plurality of high-index dielectric structures being supported by the support structure,
    c. Changing a geometry specifically of high-index dielectric structures within a second plurality of high-index dielectric structures, wherein the second plurality of high-index dielectric structures is a sub-set of the first plurality of high-index dielectric structures,
    wherein said changing the geometry is carried out by photothermally melting at least a portion of each of the high-index dielectric structures within the second plurality of high-index dielectric structures by irradiating the second plurality of high-index dielectric structures with incident electromagnetic radiation having an incident intensity in a plane of the second plurality of high-index dielectric structures,
and thereby exciting resonances associated with each of the high-index dielectric structures within the second plurality of high-index dielectric structures,
wherein said support structure comprises a first plurality of topographical features,
and wherein the first plurality of high-index dielectric structures are given by:
high-index dielectric structures on or in said topographical features,
and/or
holes in a high-index dielectric film, wherein said holes correspond to said topographical features.

E2. A method according to any one of the preceding embodiments, wherein the first plurality of high-index dielectric structures comprise germanium, such as wherein the first plurality of high-index dielectric structures consist of germanium.

E3. A method according to any one of the preceding embodiments, further comprising
preparing the topographical features by imprinting.

E4. A method according to any one of the preceding embodiments, further comprising
preparing the first plurality of high-index dielectric structures by depositing a high-index dielectric film on the support structure with the topographical features.

E5. A method according to any one of the preceding embodiments, wherein a colour printing or data recording resolution of the geometrically modified high-index dielectric structures on the support structure is below the diffraction limit with respect to the incident electromagnetic radiation.

E6. A method according to any one of the preceding embodiments, wherein a colour printing or data recording resolution of the geometrically modified high-index dielectric structures on the support structure is more than 10 kDPI, such as at least 15 kDPI, such as at least 50 kDPI, such as at least 100 kDPI, such as at least 110 kDPI, such as at least 120 kDPI, such as at least 125 kDPI or higher, such as 127 kDPI.

E7. A method according to any one of the preceding embodiments, wherein a reflectance of the second plurality of high-index dielectric structures on the support structure is less than 10%.

E8. A method according to any one of the preceding embodiments, wherein the relative permittivity (such as at 532 nm) of the first plurality of high-index dielectric structures is equal to or larger than 5 such as equal to or larger than 6, such as equal to or larger than 7, such as equal to or larger than 8, such as equal to or larger than 9, such as equal to or larger than 10.

E9. A method according to any one of the preceding embodiments, wherein the high-index dielectric structures on or in said topographical features have lateral dimensions which each exceed a dimension in a direction being orthogonal to a supporting surface of the support structure.

E10. A method according to any one of the preceding embodiments, wherein said incident intensity is less than an incident intensity required to melt a film of a corresponding material and a corresponding thickness as the high-index dielectric structures within the second plurality of high-index dielectric structures.

E11. A method according to any one of the preceding embodiments, wherein changing the geometry of specifically the second plurality of high-index dielectric structures, is carried out so as to enable any one or more or all of:
colour mixing
half-toning
dithering.

E12. A method according to any one of the preceding embodiments, wherein changing the geometry of a second plurality of high-index dielectric structures, comprises changing the geometry for high-index dielectric structures within the second plurality of high-index dielectric structures into a plurality of different geometries.

E13. A product comprising:
a. A support structure,
b. A first plurality of high-index dielectric structures, said first plurality of high-index dielectric structures being supported by the support structure,
c. A second plurality of high-index dielectric structures, wherein the second plurality of high-index dielectric structures is a sub-set, such as a proper sub-set, of the first plurality of high-index dielectric structures,
wherein a geometry specifically of the second plurality of high-index dielectric structures may be changed, wherein said changing the geometry may carried out by photothermally melting at least a portion of each of the high-index dielectric structures within the second plurality of high-index dielectric structures by irradiating the second plurality of high-index dielectric structures with incident electromagnetic radiation having an incident intensity in a plane of the second plurality of high-index dielectric structures and thereby exciting resonances associated with each of the high-index dielectric structures within the second plurality of high-index dielectric structures,
wherein said support structure comprises a first plurality of topographical features,
and wherein the first plurality of high-index dielectric structures are given by:
high-index dielectric structures on or in said topographical features,
and/or
holes in a high-index dielectric film, wherein said holes correspond to said topographical features.

E14. A product according to embodiment E13, wherein a geometry of each high-index dielectric structure within the second plurality of dielectric structures is different with respect to each high-index dielectric structure within the first plurality of high-index dielectric structure which is not within the second plurality of dielectric structures.

E15. Use of
a product comprising geometrically modified high-index dielectric structures provided according to the method according to any one of embodiments E1-E12, or
a product according to any one of embodiments E13-E14,
for any one of:
Macroscopically printing,
Microscopically printing,
Storing data,
Assessing laser power,
Sensing.

E16. A method according to any one of the preceding claims E1-E12, wherein the first plurality of high-index dielectric structures comprise a material being any one of
a. TiO$_2$,
b. Al$_2$O$_3$,
c. Si,
d. Ge,
e. GaAs,
f. InP.

For the above embodiments E1-E16, it may be understood that reference to preceding 'embodiments' may refer to preceding embodiments within embodiments E1-E16.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A method for geometrically modifying high-index dielectric structures on a support structure, said method comprising:
   a. providing a support structure,
   b. providing a first plurality of high-index dielectric structures, said first plurality of high-index dielectric structures being supported by the support structure,
   c. changing a geometry specifically of high-index dielectric structures within a second plurality of high-index dielectric structures, wherein the second plurality of high-index dielectric structures is a sub-set of the first plurality of high-index dielectric structures,
   wherein said changing the geometry is carried out by photothermally melting at least a portion of each of the high-index dielectric structures within the second plurality of high-index dielectric structures by irradiating the second plurality of high-index dielectric structures with incident electromagnetic radiation having an incident intensity in a plane of the second plurality of high-index dielectric structures,
   and thereby exciting resonances associated with each of the high-index dielectric structures within the second plurality of high-index dielectric structures,
   wherein said support structure comprises a first plurality of topographical features comprising topographical pillars or topographical holes formed on a surface of the support structure,
   and wherein the first plurality of high-index dielectric structures are given by:
      a plurality of high-index dielectric structures on said topographical pillars or in said topographical holes, and
      a plurality of holes in a high-index dielectric film, wherein said holes correspond to said topographical features,
   and wherein the relative permittivity at 532 nm of the first plurality of high-index dielectric structures is equal to or larger than 5.

2. The method according to claim 1, wherein the first plurality of high-index dielectric structures comprise germanium.

3. The method according to claim 1, further comprising: preparing the topographical features by imprinting.

4. The method according to claim 1, further comprising: preparing the first plurality of high-index dielectric structures by depositing a high-index dielectric film on the support structure with the topographical features.

5. The method according to claim 1, wherein a colour printing or data recording resolution of the geometrically modified high-index dielectric structures on the support structure is below the diffraction limit with respect to the incident electromagnetic radiation.

6. The method according to claim 1, wherein a colour printing or data recording resolution of the geometrically modified high-index dielectric structures on the support structure is more than 10 kDPI.

7. The method according to claim 1, wherein a reflectance of the second plurality of high-index dielectric structures on the support structure is less than 10%.

8. The method according to claim 1, wherein the first plurality of high-index dielectric structures comprise a material being any one of:
   a. TiO$_2$,
   b. Al$_2$O$_3$,
   c. Si,
   d. Ge,
   e. GaAs, or
   f. InP.

9. The method according to claim 1, wherein the high-index dielectric structures on or in said topographical features have lateral dimensions, which each exceed a dimension in a direction being orthogonal to a supporting surface of the support structure.

10. The method according to claim 1, wherein said incident intensity is less than an incident intensity required to melt a film of a corresponding material and a corresponding thickness as the high-index dielectric structures within the second plurality of high-index dielectric structures.

11. The method according to claim 1, wherein changing the geometry of specifically the second plurality of high-index dielectric structures, is configured to allow:
   colour mixing,
   half-toning, or
   dithering.

12. The method according to claim 1, wherein changing the geometry of a second plurality of high-index dielectric structures, comprises changing the geometry for high-index dielectric structures within the second plurality of high-index dielectric structures into a plurality of different geometries.

13. The method according to claim 1, wherein the first plurality of high-index dielectric structures are present on a lens.

14. The method according to claim 13, wherein the lens is an ophthalmic lens.

15. The method according to claim 1, wherein the first plurality of high-index dielectric structures are present on a lens and, wherein said lens is any one of:
   a. a lens for a pair of glasses, or
   b. a contact lens.

16. The method according to claim 1, wherein the plurality of high-index dielectric structures are isolated high-index dielectric structures.

17. A product comprising:
  a. a support structure,
  b. a first plurality of high-index dielectric structures, said first plurality of high-index dielectric structures being supported by the support structure,
  c. a second plurality of high-index dielectric structures, wherein the second plurality of high-index dielectric structures is a sub-set of the first plurality of high-index dielectric structures,
  wherein a geometry specifically of the second plurality of high-index dielectric structures may be changed, wherein said changing the geometry may carried out by photothermally melting at least a portion of each of the high-index dielectric structures within the second plurality of high-index dielectric structures by irradiating the second plurality of high-index dielectric structures with incident electromagnetic radiation having an incident intensity in a plane of the second plurality of high-index dielectric structures and thereby exciting resonances associated with each of the high-index dielectric structures within the second plurality of high-index dielectric structures,
  wherein said support structure comprises a first plurality of topographical features comprising topographical pillars or topographical holes formed on a surface of the support structure,
  and wherein the first plurality of high-index dielectric structures are given by:
    a plurality of high-index dielectric structures on said topographical pillars or in said topographical holes, and
    a plurality of holes in a high-index dielectric film, wherein said holes correspond to said topographical features,
  and wherein the relative permittivity at 532 nm of the first plurality of high-index dielectric structures is equal to or larger than 5.

18. The product according to claim 17, wherein a geometry of each high-index dielectric structure within the second plurality of dielectric structures is different with respect to each high-index dielectric structure within the first plurality of high-index dielectric structure which is not within the second plurality of dielectric structures.

19. The product according to claim 17, wherein the product furthermore comprises a lens and, wherein the first plurality of high-index dielectric structures are present on the lens.

20. The product according to claim 17, wherein the lens is an ophthalmic lens.

21. A pair of glasses comprising a lens according to claim 20.

22. The product according to claim 17, wherein the product furthermore comprises a lens, wherein the first plurality of high-index dielectric structures are present on the lens and, wherein said lens is a lens for a pair of glasses.

23. The product according to claim 17, wherein the product further comprises a lens, wherein the first plurality of high-index dielectric structures are present on the lens and, wherein said lens is a contact lens.

24. A method of using the product of claim 17 comprising: providing the product of claim 17; and using said product to macroscopically print, microscopically print, sort data, assess laser power, sensing, focus a beam of electromagnetic radiation, or disperse a beam of electromagnetic radiation.

25. A method for geometrically modifying high-index dielectric structures on a support structure, comprising:
  providing a support structure comprising topographical pillars or topographical holes formed on a surface of the support structure, wherein said support structure supports a first plurality of high-index dielectric structures, wherein the first plurality of high-index dielectric structures are given by a plurality of high-index dielectric structures on said topographical pillars or in said topographical holes, and a plurality of holes in a high-index dielectric film, wherein said holes correspond to said topographical features, wherein the relative permittivity at 532 nm of the first plurality of high-index dielectric structures is equal to or larger than 5; and
  changing a geometry of the high-index dielectric structures located on said topographical pillars or in said topographical holes and within a second plurality of the high-index dielectric structures, wherein the second plurality of high-index dielectric structures is a sub-set of the first plurality of high-index dielectric structures, by photothermally melting at least a portion of each of the high-index dielectric structures within the second plurality of high-index dielectric structures by irradiating the second plurality of high-index dielectric structures with incident electromagnetic radiation having an incident intensity in a plane of the second plurality of high-index dielectric structures and thereby exciting resonances associated with each of the high-index dielectric structures within the second plurality of high-index dielectric structures.

26. A product comprising: a support structure comprising topographical pillars or topographical holes formed on a surface of the support structure, wherein said support structure supports a first plurality of high-index dielectric structures, wherein the first plurality of high-index dielectric structures are given by a plurality of high-index dielectric structures on said topographical pillars or in said topographical holes, and a plurality of holes in a high-index dielectric film, wherein said holes correspond to said topographical features, wherein the relative permittivity at 532 nm of the first plurality of high-index dielectric structures is equal to or larger than 5; and wherein a geometry of the high-index dielectric structures located on said topographical pillars or in said topographical holes and within a second plurality of the high-index dielectric structures, wherein the second plurality of high-index dielectric structures is a sub-set of the first plurality of high-index dielectric structures, may be changed by photothermally melting at least a portion of each of the high-index dielectric structures within the second plurality of high-index dielectric structures by irradiating the second plurality of high-index dielectric structures with incident electromagnetic radiation having an incident intensity in a plane of the second plurality of high-index dielectric structures and thereby exciting resonances associated with each of the high-index dielectric structures within the second plurality of high-index dielectric structures.

27. A method for geometrically modifying high-index dielectric structures on a support structure, said method comprising:
  a. providing a support structure,
  b. providing a first plurality of high-index dielectric structures, said first plurality of high-index dielectric structures being supported by the support structure, c. changing a geometry specifically of high-index dielectric structures within a second plurality of high-index dielectric structures, wherein the second plurality of high-index dielectric structures is a sub-set of the first plurality of high-index dielectric structures, wherein said changing the geometry is carried out by photothermally melting at least a portion of each of the high-index dielectric structures within the second plurality of high-index dielectric structures by irradiating the second plurality of high-index dielectric structures with incident electromagnetic radiation having an incident intensity in a plane of the second plurality of high-index dielectric structures, and thereby exciting resonances associated with each of the high-index dielectric structures within the second plurality of high-index dielectric structures, wherein said support structure comprises a first plurality of topographical features comprising topographical pillars or topographical holes formed on a surface of the support structure, and wherein the first plurality of high-index dielectric structures are given by:
- a plurality of high-index dielectric structures on said topographical pillars or in said topographical holes, and
- a plurality of holes in a high-index dielectric film, wherein said holes correspond to said topographical features, and
wherein said first plurality of high-index dielectric structures are prepared by depositing a high-index dielectric film on the support structure on said topographical pillars or in said topographical holes, and on the support structure between said topographical pillars or said topographical holes, and wherein the relative permittivity at 532 nm of the first plurality of high-index dielectric structures is equal to or larger than 5.

* * * * *